United States Patent [19]
Hulstedt

[11] Patent Number: 5,441,437
[45] Date of Patent: Aug. 15, 1995

[54] COMPLIANT CONSTANT-FORCE FOLLOWER DEVICE FOR SURFACE FINISHING TOOL

[76] Inventor: Bryan A. Hulstedt, 6280 White Buck Trail, Rockford, Ill. 61102

[21] Appl. No.: 19,421

[22] Filed: Feb. 18, 1993

[51] Int. Cl.6 .............................................. B24B 49/00
[52] U.S. Cl. .......................................... 451/1; 451/5; 451/8; 451/9; 451/10; 451/303; 451/304
[58] Field of Search ........... 51/165.71, 165.74, 165.76, 51/165.77, 165.8, 165.82, 141; 451/1, 5, 8, 9, 10, 11, 19, 21, 24, 296, 303, 304

[56] References Cited

U.S. PATENT DOCUMENTS

| | | | |
|---|---|---|---|
| 3,524,285 | 8/1970 | Rutt . | |
| 3,603,041 | 9/1971 | McDonald | 51/138 |
| 3,691,698 | 9/1972 | Schaller . | |
| 3,897,655 | 8/1975 | Bain | 51/56 |
| 4,488,382 | 12/1984 | Zajac et al. . | |
| 4,601,134 | 7/1986 | Hessemann . | |
| 4,663,892 | 5/1987 | Smith | 51/289 R |
| 5,035,087 | 7/1991 | Nishiguchi et al. | 51/165.77 |
| 5,044,124 | 9/1991 | Niimura et al. | 51/165.77 |
| 5,054,244 | 10/1991 | Takamatsu et al. | 51/165.77 |
| 5,177,903 | 1/1993 | Maier | 51/165.77 |
| 5,185,961 | 2/1993 | Maier | 51/165.77 |
| 5,299,389 | 4/1994 | Yonaha et al. | 51/165.77 |

FOREIGN PATENT DOCUMENTS 3716832 12/1988 Germany .

OTHER PUBLICATIONS

Technical Paper "Development of Force and Monitoring Sensors for Deburring Robot", Akira Morikawa et al, Society of Manufacturing Engineers, 1987, 16 pages.
"Specification of an Active Force Control Tool For Performing Deburring and Chamfering on a Robot Platform", Randall K. Roberts et al, Nov. 1992, 9 pages.
"Advanced Deburring System Technology", Frederick M. Proctor et al, Dec. 1989, 10 pages.
"Automating Robot Programming in the Cleaning and Deburring Workstation of the AMRF", Frederick M. Proctor et al, Feb. 1989, 11 pages.
"CAD" Directed Robotic Deburring, K. N. Murphy et al, Nov. 1988, 6 pages.
Robotic Deburring and Finishing, Methods, and Applications, Tim Graf, 3M, 1990, 16 pages.
3M Surface Conditioning Technical Papers, "Deburring and Finishing Applications Using Robots and Computerized Automation", T. L. Graf, 1988, 20 pages.

*Primary Examiner*—Maurina T. Rachuba
*Attorney, Agent, or Firm*—Flynn, Thiel, Boutell & Tanis

[57] ABSTRACT

A floating-type or compliant follower system for use in conjunction with a robotic or automated workpiece finishing apparatus. The follower device in a preferred embodiment cooperates with the tool to create a contact force with the workpiece which can be maintained constant with a high degree of accuracy and with a high responsiveness. The follower device in a preferred embodiment includes a constant-torque rotatable electric motor, such as a servo motor, which torque remains constant even when the motor is held in a stall condition by an external load or is driven backwards by the load. The motor output is drivingly coupled through a rotary-to-linear drive mechanism to a follower which is coupled to a driving tool such as a belt grinder. Energization of the follower motor causes the follower to act against the tool to maintain a constant force between the tool and workpiece, with the motor rotor being maintained substantially in a stall condition, but being capable of oscillating back and forth while maintaining a substantially constant torque to maintain a constant contact force.

10 Claims, 5 Drawing Sheets

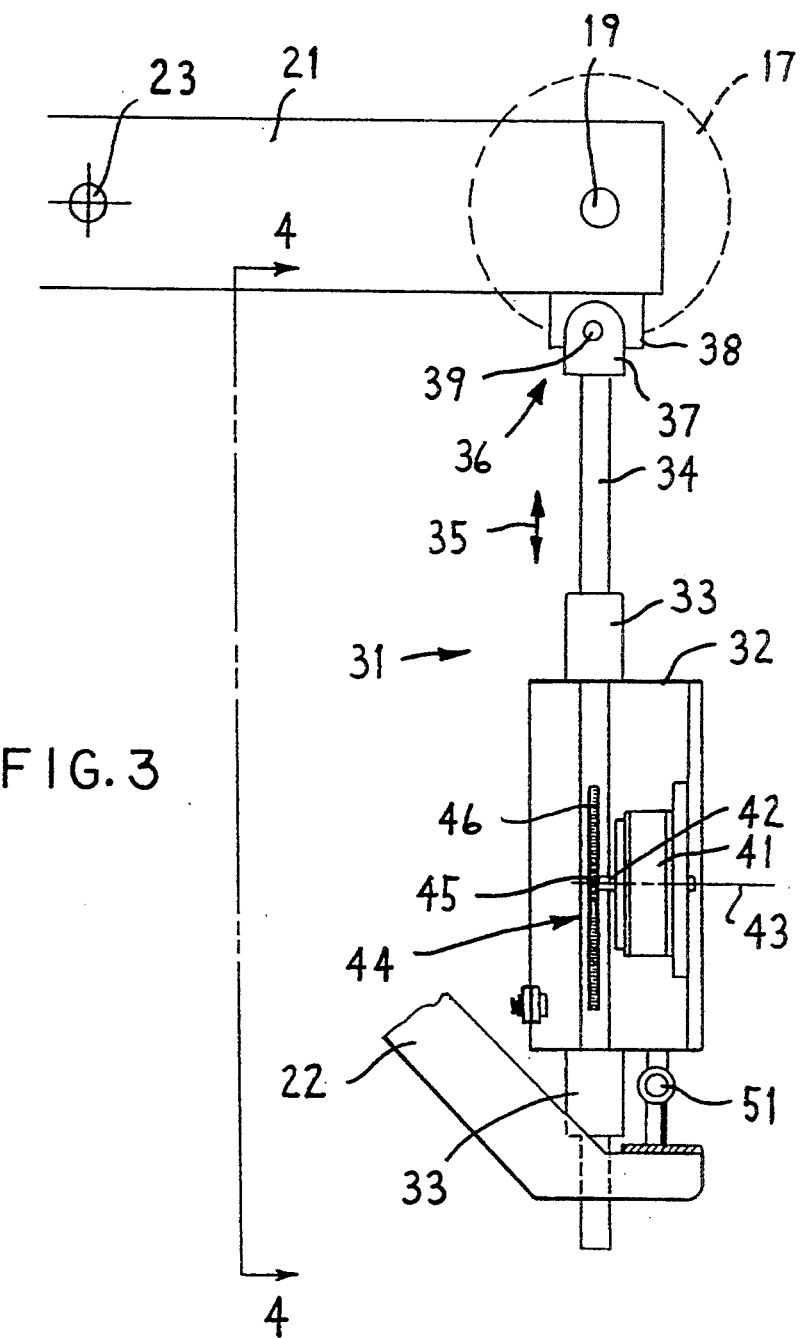

SYSTEM BLOCK DIAGRAM

SYSTEM OPERATIONAL FLOWCHART

COMPLIANT CONSTANT-FORCE FOLLOWER DEVICE FOR SURFACE FINISHING TOOL

FIELD OF THE INVENTION

This invention relates to an improved compliant constant-force follower device particularly for use with a finishing tool, such as for surface polishing or conditioning of workpieces, and more particularly to such device configured to function as an active force system which senses actual force between a workpiece and a surface finishing tool and automatically controls the compliant follower to maintain such force constant.

BACKGROUND OF THE INVENTION

In surface finishing or conditioning of workpieces, the surface of the workpiece is treated so as to remove irregularities such as machining marks, burrs, parting lines and the like to provide a desired finished surface appearance. This finishing, one variation of which is often referred to as polishing, may involve use of either soft or stiff abrasive members, such as in belt grinding. In this surface finishing technique, however, material is not being removed from the workpiece to provide a specific dimension such as occurs when machining a workpiece. Rather, in surface finishing the workpiece has generally already been machined to the desired tolerances or dimensions, and the surface finishing is for the purpose of providing the desired surface appearance. The surface finishing technique is thus not dimensionally controlled. Rather, the critical aspect of surface finishing is the pressure or force applied between the workpiece and the tool so as to result in the desired surface finish.

In recent years, surface finishing is often carried out using robots which mount either the tool or the workpiece, and various compliant-type follower devices mount the other of the tool and workpiece during the finishing operation. The robot can be pre-programmed and typically mounts the workpiece or part so as to permit manipulated movement thereof through a prescribed path. Such pre-programmed movement, however, cannot readily adjust for changes in contact force or pressure between the tool and workpiece, and thus various types of compliant follower devices have been provided for use in association with the workpiece in an attempt to compensate for workpiece contour and/or position change, while still enabling the tool to follow the workpiece and maintain finishing contact therewith. In its simplest variation, the use of passive compliant follower devices employing springs is well known, although such devices are unsuitable for surface finishing of many workpieces since spring force varies in an approximate linear manner in proportion to displacement, and causes the contact force or pressure between the workpiece and tool to significantly vary.

To improve upon the passive-type compliant or floating follower, such as a mechanical spring device as briefly discussed above, air devices have been developed. The air-actuator follower devices have proven more desirable in that they do possess the capability of maintaining a substantially constant pressure or force on the tool while still enabling the tool to positionally float so as to properly follow the workpiece. The passive air followers, however, are known to be suitable only in environments wherein the response time between the tool and workpiece is relatively slow since fluid systems do not have the ability to provide a rapid response and are unable to properly adjust and follow rapid force changes between the tool and workpiece. Further, these passive systems and particularly the passive air systems are significantly influenced by the inertia of the moving parts as well as by environmental conditions and breakaway friction, and are not particularly suitable for low force applications since the inertia effect can cause the actual contact force between the tool and workpiece to be significantly effected when a low constant contact force is the desired objective, and the break-away friction can cause a slow response time so as to prevent the system from timely responding to force changes.

It has been suggested that a passive follower system could utilize constant force electric solenoids so as to permit floating follower movement while maintaining substantially constant force. However, this system was apparently only theoretically suggested, and it is believed that such system is not only undesirable but in actuality is not practical. Electric solenoids are typically designed to have a small predetermined stroke or displacement, and, while solenoids are known which attempt to provide a constant force, nevertheless even these solenoids are known to experience a nonlinear (i.e., a nonconstant) force relationship through the permissible stroke. These solenoids are also nonlinear with respect to output force magnitude relative to magnitude of input current. This thus makes such devices unsuitable for use as a truly constant force follower. Further, with higher force ranges, such solenoids become large and heavy, and have large electrical energy requirements, and hence are unsuitable for these additional reasons.

Because of deficiencies associated with passive follower systems, numerous attempts have been made to develop follower systems which are referred to as "active" systems. The most conventional "active" system is one which is often referred to as an active position system. Such follower systems rely on position control for adjusting contact force or pressure through a feedback system. Most typically an attempt is made to monitor the position of the workpiece and then, through a suitable feedback control system, to adjust the position of the tool in an attempt to maintain constant force. With the active position systems, however, mechanical and circuit processing time delays are generally of sufficient significance as to prevent the force from being adjusted with a sufficiently rapid response time as to maintain such force constant. Further, this arrangement normally requires a rather rigid or stiff drive arrangement, rather than a floating or compliant follower arrangement, and such arrangement does not permit back driving of the follower (i.e., the follower cannot move on its own due to application of external force thereto through the tool).

Because of difficulties associated with active position systems, attempts have been made to provide a floating compliant system which is controlled by an active force system. In an active force system, the follower still possesses compliance so as to be capable of being back driven, but in addition responds to the force between the workpiece and tool and, through appropriate feedback, constantly adjusts the force to compensate for inertial effects and the like as the tool moves back and forth so as to follow the workpiece while still maintaining a theoretically constant contact force. At present, an attempt is being made to provide an active force system employing a pneumatic follower of the type which has been conventionally utilized in passive systems. However, it is believed that such pneumatic-driven active force systems still lack the desired responsiveness, and in addition result in a system having higher mechanical complexity and less reliability such as is inherent in pneumatic control arrangements.

Accordingly, it is an object of this invention to provide an improved floating-type or compliant follower system for use in conjunction with a robotic or automated workpiece finishing apparatus, which follower device in a preferred embodiment cooperates with the tool to maintain a contact pressure or force between the tool or workpiece which can be maintained constant with a high degree of accuracy and precision and with a high responsiveness, so as to overcome many of the disadvantages associated with prior follower systems of the types briefly described above.

More specifically, this invention relates to an improved floating-type or compliant follower device which can be used as a passive device but which can also desirably function as an active force system so as to rapidly respond to both inertial effects and positional variational effects between the tool and workpiece so as to maintain a constant pressure or force between the tool and workpiece to achieve a desired surface finish.

In the improved floating follower device of the present invention, and particularly in a preferred embodiment of this device, there is provided a constant-torque rotatable electric motor, such as a servo motor, wherein the rotatable rotor is subjected to constant torque, which torque remains constant even when the motor is held in a stationary or stall condition by an external load or is driven backwards by the load. The motor output shaft as secured to the rotor is drivingly coupled through a suitable rotary-to-linear drive mechanism to an output member or follower. The motion transfer, in a typical embodiment, may comprise a simple gear-rack mechanism to minimize friction while being capable of being back driven (i.e., driven by the follower). The follower in turn is coupled to a driving tool such as a belt grinder or the like, the latter being maintained in contact with a workpiece which is typically mounted on and is positionally controlled by a robot arm. Energization of the follower motor causes the follower to act against the tool to maintain a constant force or pressure between the tool and workpiece, with the motor rotor being maintained substantially in a stall condition, but being capable of oscillating back and forth while maintaining a substantially constant torque so as to maintain the tool in contact with the workpiece while maintaining a constant contact force or pressure therebetween. The tool can movably respond either toward or away from the center of the workpiece so as maintain proper surface contact therewith while still maintaining constant contact pressure, with the follower suitably reciprocating back and forth so as to follow the workpiece contour, including back driving through the gear-rack mechanism to the rotor when necessary, while maintaining constant torque in the motor and constant contact force at the tool-workpiece contact point.

In the present invention, the follower device can be used as a passive follower as described above, but more desirably is used as an active force follower system. A suitable force sensor is preferably provided so as to accurately and substantially continuously measure the contact force between the tool and workpiece and, through a suitable feedback control loop, the torque of the follower motor can be constantly and substantially continuously adjusted in small increments to maintain the contact force between the tool and workpiece constant, thereby rapidly compensating and adjusting for inertial effects and positional changes of the contact point.

Other objects and purposes of the invention will be apparent upon reading the following specification and inspecting the accompanying drawings.

BRIEF DESCRIPTION OF THE DRAWINGS

FIG. 3 is an enlarged fragmentary elevational view of the follower device.

Figure 2:
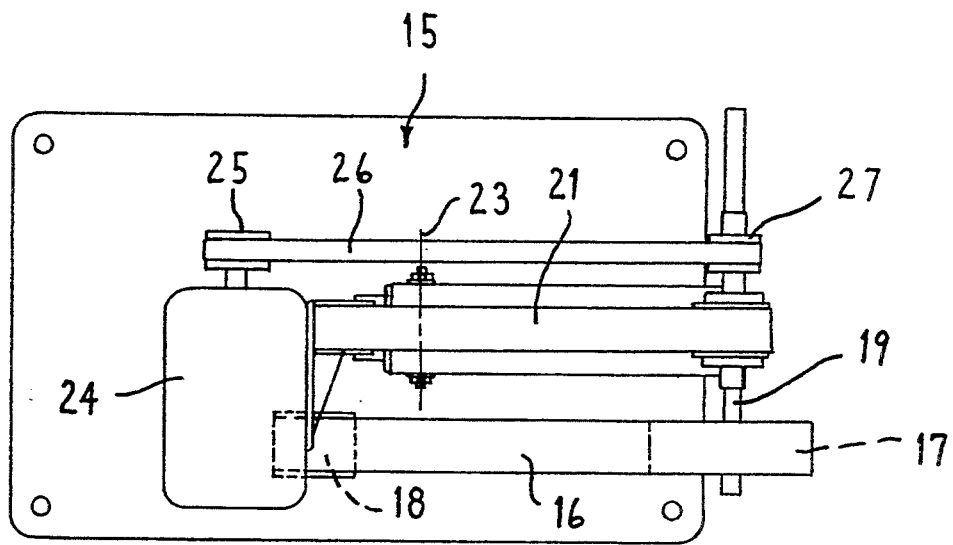
FIG. 2 is a top view of FIG. 1.

Certain terminology will be used in the following description for convenience in reference only, and will not be limiting For example, the words "upwardly", "downwardly", "rightwardly" and "leftwardly" will refer to directions in the drawings to which reference is made. The words "inwardly" and "outwardly" will refer to directions toward and away from, respectively, the geometric center of the device and designated parts thereof. Said terminology will include the words specifically mentioned, derivatives thereof, and words of similar import.

DETAILED DESCRIPTION

Figure 1:
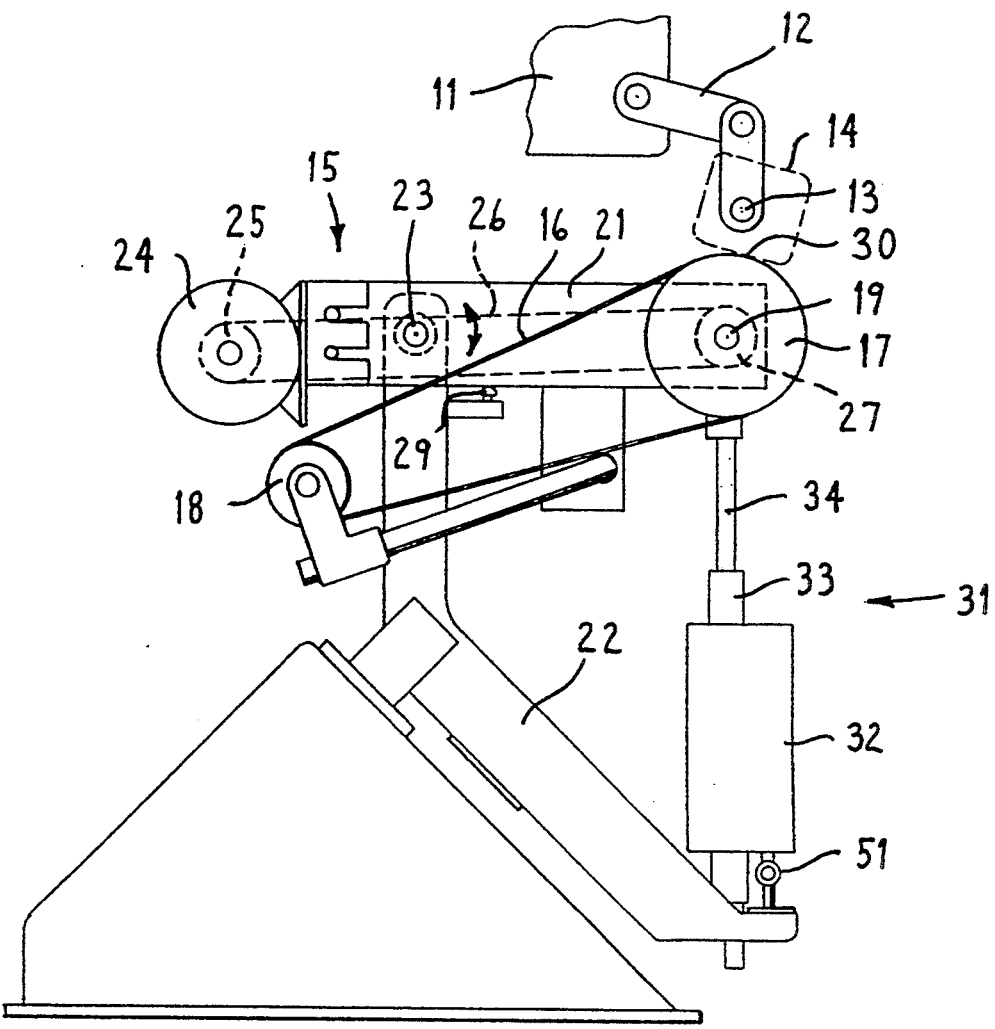
FIG. 1 is an elevational view of an embodiment of a floating follower according to the present invention, with the follower being illustrated for use in conjunction with a grinding belt as used with a robot to effect surface finishing.
Figure 4:
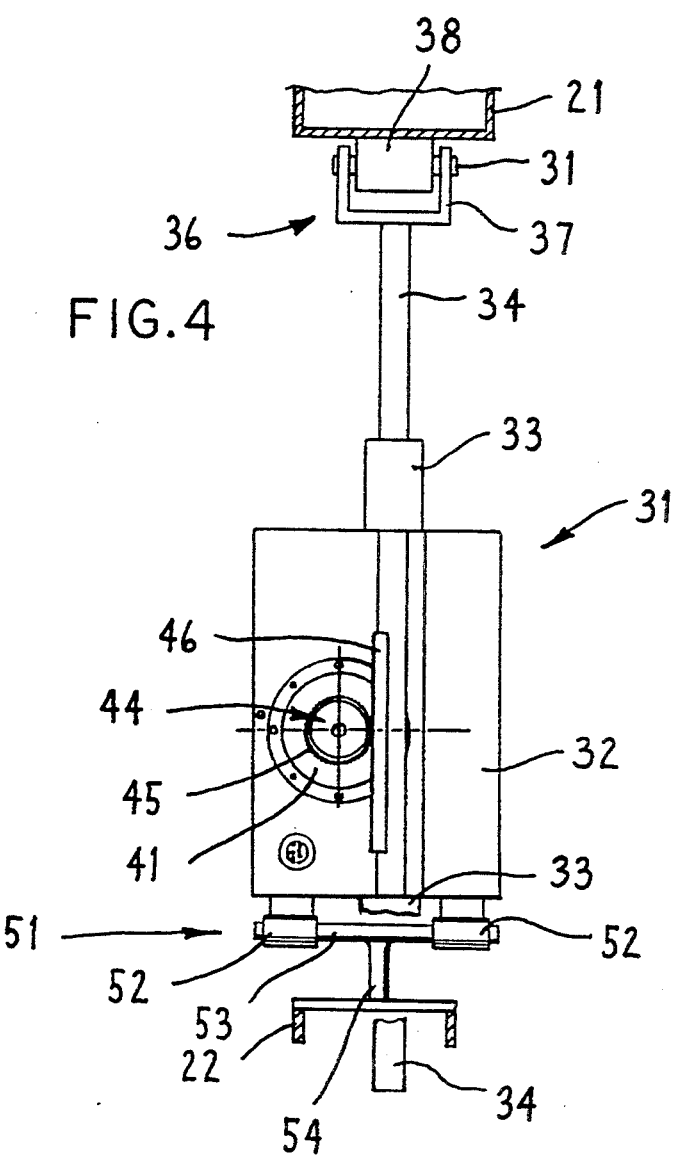
FIG. 4 is a view taken in the direction of arrow 4 in FIG. 3.

Referring to FIGS. 1 and 2, there is illustrated an automated workpiece finishing arrangement and more specifically a robotic arrangement which includes a conventional robot 11 having a movable arm 12. The robot arm has a conventional rotatable support shaft 13 on which a workpiece or tool can be mounted. FIG. 1 diagrammatically illustrates by dotted lines a workpiece 14 mounted on the support 13, which workpiece 14 will conventionally have an irregular (i.e., a noncircular) surface which is to be finished.

A finishing tool assembly 15 (a belt grinder in the illustrated embodiment) is disposed for cooperation with the workpiece 14 to effect surface finishing thereof. The illustrated belt grinder is generally conventional and includes a movable finishing tool 16 formed as an abrasive belt which is movably supported by a pair of spaced but generally parallel rollers 17 and 18. The roller 17 is a drive roller which is supported on a rotatable axis 19 which in turn is rotatably supported adjacent one end of an elongate arm 21. This arm 21 in turn is swingably supported on the tool frame or housing 22 by a pivot 23 which extends horizontally in generally parallel relationship to the rotational axis of the axle 19, whereby the arm 21 is vertically swingable. A conventional electric tool driving motor 24 is mounted on the arm 21 adjacent the other end thereof, and drives a pulley 25 which through an intermediate drive belt 26 drives a driven pulley 27 which is coaxially secured to the axle 19. The motor and related structure provided at the leftward end of the arm 21 functions as a partial counterbalance for the arm, although the balance is typically determined such that the rightward end of the arm (the end mounting the roller 17) will tend to swing downwardly into a lowermost position as determined by engagement of the arm 21 against a fixed but adjustable stop 29. The arm 21 permits vertical pivotal movement of the tool roller 17 substantially as indicated by the arrow 26.

The tool, as defined by the roller 17 and the abrasive belt 16 supported thereon, is vertically swingably displaceable upwardly away from the stop 29 so as to permit finishing of a workpiece surface, such being created by engagement between the tool and the workpiece at a contact area or point 30, with the workpiece surface additionally being moved relative to the tool, such as by rotation of the workpiece 14 about the axis of the support shaft 13.

To maintain the tool or belt 16, 17 in finishing contact with the workpiece 14 at the contact area 30, there is provided a floating or compliant follower device 31 according to the present invention. This follower device 31 cooperates with the finishing tool assembly 15 to maintain the tool 16-17 in contact with the surface of the workpiece 14 while maintaining a constant contact pressure or force to thus provide for desired surface finishing of the workpiece as the latter moves through its path of movement due to driving of the robot.

The follower device 31 includes a housing part 32 having a pair of aligned low-friction guides or bearings 33 for slidably supporting an elongate rodlike follower 34, the latter being vertically oriented and reciprocally movable in the lengthwise direction thereof, such as indicated by arrow 35. The top end of follower 34 is coupled to the swing arm 21, preferably in close proximity to the tool 16, 17, by a low-friction bearing arrangement 36. This bearing arrangement 36 includes a yoke part 37 secured to the upper end of follower 34, and a hinge part 38 fixedly secured to the underside of arm 21, with the yoke and hinge parts being coupled by a hinge pin 39 which defines a horizontally extending hinge axis which extends parallel with the swing arm axis 23. This bearing arrangement 36 also provides limited lateral clearance, that is clearance between the interleaved yoke and hinge parts 37 and 38, so as to permit limited lateral displacement therebetween along the horizontal axis defined by the hinge pin 39.

The floating follower device 31 mounts thereon a rotary motor 41 which is of a constant-torque type. The motor 41 has the housing or casing thereof stationarily secured relative to the housing part 32, and the rotatable rotor (not shown) of the motor is provided with a motor shaft 42 which projects outwardly and is rotatable about a generally horizontal axis 43 which extends generally perpendicularly with respect to the reciprocal direction of movement of the follower 34. The motor shaft 43 is drivingly coupled to the rodlike follower 34 through a rotary-to-linear transfer mechanism 44 which is of a type which can be back driven, that is, force can be transferred from the motor through the mechanism 44 to the rodlike follower 34 or vice versa. This transfer mechanism 44 in the illustrated embodiment includes a gear or pinion 45 secured to the motor shaft 42, which gear 45 is disposed in meshing engagement with an elongate gear rack 46 which is fixedly provided on and extends longitudinally along the rodlike follower 34.

The follower housing part 32 is supported from the frame 22 by a hinge arrangement 51 which permits the entire follower mechanism 31 to swingably move in a vertical plane perpendicular to the swing arm axis 23 so as to swing in a plane substantially parallel with the swinging movement of the arm 21, and which also permits lateral movement (i.e., movement perpendicular to this vertical plane) of the follower device 31 relative to the finishing tool assembly. This hinge arrangement 51 includes a pair of sleevelike bearing housings 52 which are fixed to the housing part 32 adjacent the lower end thereof, which bearing housings 52 are aligned generally horizontally in a sideward direction which is generally parallel with the axis defined by the top bearing arrangement 36. These bearing housings 52 rotatably and axially slidably support a horizontally elongate hinge rod 53 therein, the latter defining a horizontal hinge axis which is also parallel to the pivot 23 of the swing arm. This hinge rod 53, adjacent the middle thereof, is fixedly secured to a bridging part 54 which in turn is fixed to the stationary frame 22. This bottom bearing arrangement 51 also permits the hinge rod 53 to be axially slidably moved relative to the bearing housings 52 to permit lateral displacement of the follower unit 31 relative to the swing arm 21.

All of the bearing arrangements described above, including the top bearing arrangement 36, the bottom bearing arrangement 51 and the follower bearings 33 are all low-friction bearings of the type commonly referred to as "skate" bearings, and may involve ball-slide bearings or may involve journal bearings constructed of stainless steel or ceramic materials, since such bearings possess minimal frictional effects and create minimal breakaway friction when relative movement at the bearing is required. Further, the vertical orientation of the rodlike follower 34 relative to the finishing tool, and the ability of the entire follower assembly 31 to vertically pivot parallel to the swing arm 21 or move laterally relative thereto, not only greatly minimizes breakaway friction, but results in the weight of the follower 34 and the external loads thereon being transmitted directly vertically downwardly through the rack to the driving pinion and motor, with very minimal frictional contact occurring between the follower rod 34 and the bearings 33, so that breakaway friction in the overall system is greatly minimized.

With the follower device 31 of the invention as described above, the magnitude of the constant torque generated by the follower motor 41, and accordingly the biasing force imposed by the motor on the follower rod 34, is a function of the magnitude of the constant current applied to the follower motor 41. The follower motor 41 is preferably a servo motor, as described in greater detail below, and hence the magnitude of the constant torque generated by the motor is a function of the current supplied to the motor, with the constant torque and supply current defining a generally linearly relationship. The magnitude of motor torque can be readily selected and in fact predetermined by varying the current as supplied to the follower motor.

In operation, a constant current is applied to the rotary follower motor 41 so as to generate a constant torque which is applied to the motor rotor and thus to the motor shaft 42 and pinion 45. The torque from the pinion is transferred to the gear rack 46 and hence results in imposition of a constant upwardly directed force on the rodlike follower 34, which constant force continually urges the tool 16-17 upwardly to maintain a constant contact force or pressure at the contact point 30 between the tool 16-17 and workpiece 14. The motor rotor is maintained generally in a stall condition since, so long as the tool 16-17 remains vertically stationary, the follower 34 also remains vertically stationary and the motor rotor likewise remains stationary, although subjected to a constant torque which continually biases or urges the follower in an upward direction under a constant force. However, as the contact point 30 moves upwardly, such as due to rotation of the workpiece, the biasing or upward urging force of the follower 34 causes the tool 16-17 to follow the workpiece surface and continue to maintain a substantially constant contact force or pressure. Similarly, if the movement of the workpiece causes the contact area 30 to move downwardly, then the follower 34 will also move freely downwardly and cause a limited angular displacement of the motor rotor in a rearward direction, but at the same time the motor rotor is still acted on by a constant torque and continues to apply a constant upwardly directed force to the follower 34 so as to maintain a constant contact pressure at the contact point 30.

With the system operating in the manner described above, the follower device basically functions as a passive device in that it will respond to and follow changes in position of the contact point 30, while at the same time maintaining a constant contact force or pressure between the tool and workpiece so long as a constant current is supplied to the follower motor 41. In this passive system, the contact force or pressure will vary only due to inertial effects of the moving parts, which inertial effects are insignificant in many applications. Further, effects of inertia are further minimized by the fact that the follower device preferably cooperates directly with the tool substantially as described above, rather than through a mechanically and structurally complex robot arm arrangement, and the follower device is mechanically simple and is constructed of small and relatively lightweight components which simplify the overall structure and minimize the effects of inertia and break-away friction.

While the embodiments of the invention as described above have illustrated the follower device cooperating directly with the tool, rather than the workpiece, it will be appreciated that this orientation could be reversed since in many instances the tool is mounted on the robot arm for cooperation with the workpiece. It will also be appreciated that the tool itself could be mounted on some type of moving head assembly, with the tool as mounted on the moving head assembly still be provided with a follower device of the type described herein so as to provide the same desirable result.

In addition, the follower of the present invention is also suitable for controlling more than one direction. For example, a workpiece could be mounted on a two or three axis work table assembly, with movement of the table along each axis being controlled by a separate constant-force follower device so as to cause and maintain the workpiece, when engaged with a tool, to have the desired constant force contact therebetween.

The embodiment described above relates specifically to a tool arrangement wherein the tool constitutes an abrasive belt, but it will be appreciated that the same device could also utilize a rotatable abrasive wheel such as a grinding or polishing wheel.

The constant force floating follower of the present invention, and the embodiment thereof which is illustrated by FIGS. 1-4, can also be suitably controlled so as to define an active force system using an open feedback control loop which actively and substantially continuously measures the contact force and constantly adjusts the torque of the follower motor to maintain a constant contact force, thereby adjusting for inertial effects, wear, positional changes and the like. Such active force control system, when applied to the follower of FIGS. 1-4, is additionally described with references to FIGS. 5 and 6.

Figure 5:
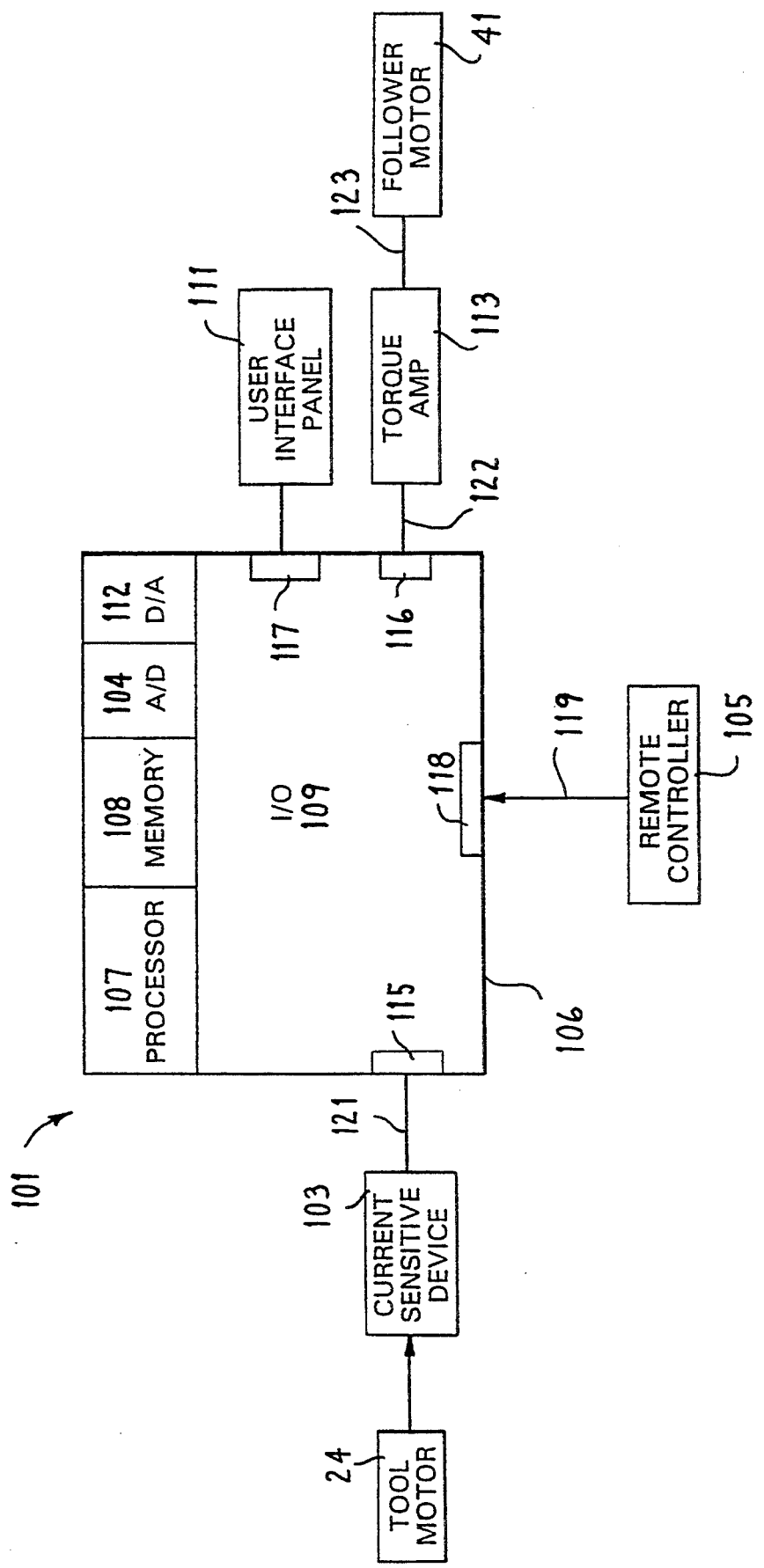
FIG. 5 is a block diagram of a control arrangement for use with the floating follower device of FIGS. 1-4 so as to provide an active force system.

Referring now to FIG. 5, there is seen a control system 101 of the present invention. The control system 101 includes user interface panel 111, conventional programmable logic controller 106, tool motor 24, current or load sensing device 103, torque amplifier 113, and follower motor 41. Current sensing device 103 senses external load-induced current variations in tool motor 24 (or alternately could directly sense the change in force of the follower 34). Load current variations occur as a result of varying loading conditions on the output shaft of the tool motor 24 due to pressure or force change at the contact area 30 between the tool and workpiece. Line 121 couples the output signal of current sensing device 103 to I/O (input/output) port 115 of the programmable logic controller 106.

Programmable logic controller 106 includes conventional circuitry such as: processor 107, memory 108, interface circuitry 109, analog/digital signal converters 104 and 112, and I/O ports 115 through 118. I/O port 117 couples user interface panel 111 to the programmable logic controller 106. I/O port 118 permits discrete binary data from remote controller devices, such as robotic controller 105 associated with the robot 11, to interface with the programmable logic controller 106 via line 119. I/O port 116 couples the output signal from the programmable logic controller 106 to torque amplifier 113 via line 122. The output signal of the programmable logic controller 106 is a reference voltage which represents a specific baseline pressure or force value. The torque circuit 113 converts the reference voltage on line 122 into a specific driver current signal for driving the follower motor 41 via line 123.

The follower motor 41 is, in a preferred embodiment, a conventional DC servo motor having multiple overlapping rotor windings. The DC servo motor operates in a stall rotor condition at a 100 percent duty cycle. The DC servo motor can be characterized as having a linear relationship between input current and output torque, and therefore output torque can be predicted by applying a specific input current to the follower motor 41.

The open-loop feedback control feature of the present invention provides open-loop feedback control for the follower motor 41. Baseline pressure or force values are set via the discrete binary input line 119 while the open-loop feedback signal on line 121 is fed from current or load sensing device 103 to I/O port 115 of programmable logic controller 106.

Figure 6:
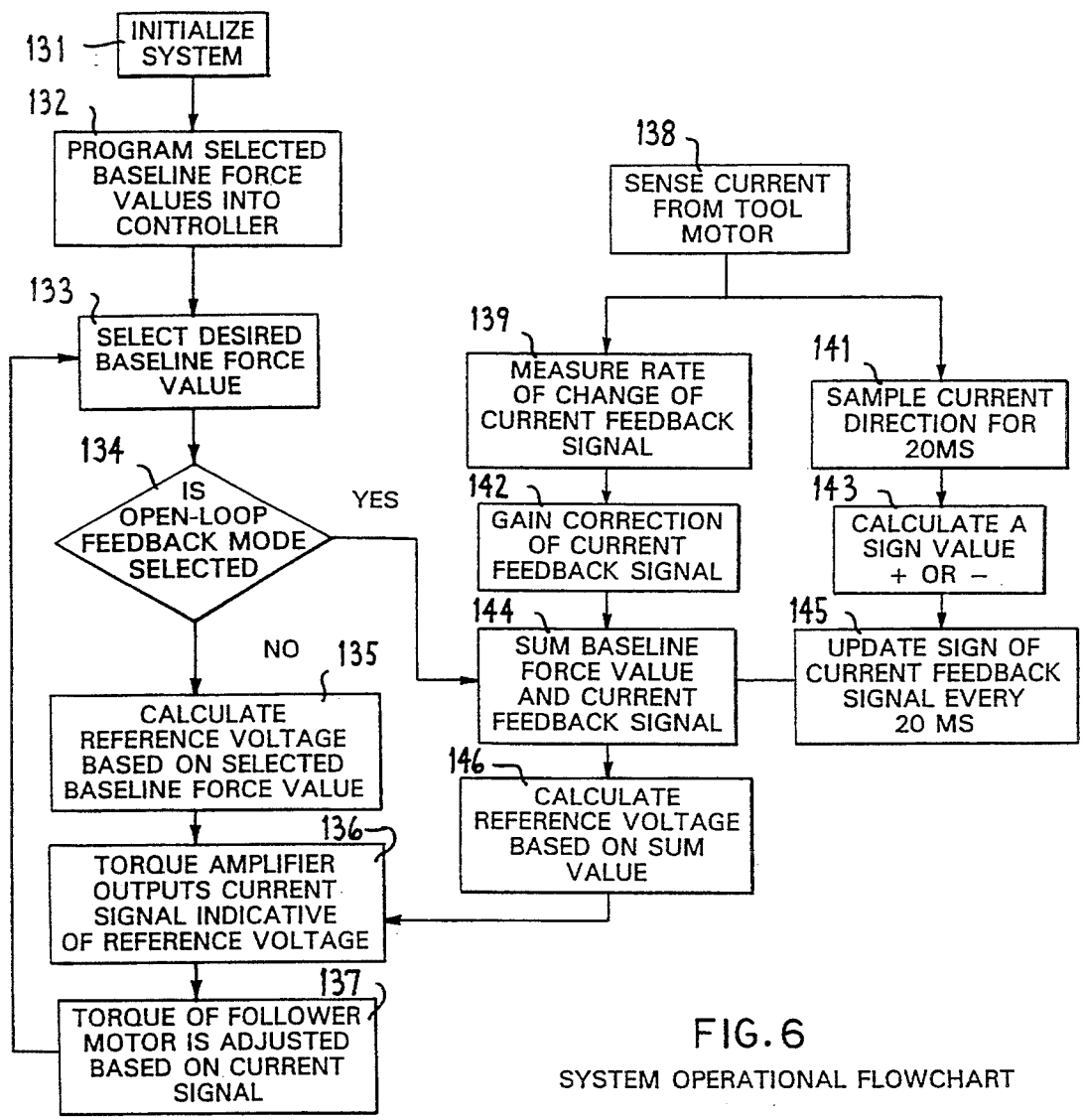
FIG. 6 is an operational control diagram for the system of FIG. 5.

A system operational flowchart for the open-loop feedback feature is shown in block diagram form in FIG. 6. The programmable logic controller software includes initialization programs that must be performed by the user upon initial start-up of the control system. The open-loop feedback feature has an automatic gain scaling program to substantially instantaneously control the reaction time of the follower motor under varying load conditions. The gain scaling program automatically adjusts the gain break point according to the load applied to the tool motor 24. The results are improved ability to maintain contact between the tool 16 and the workpiece 14 at the selected constant baseline pressure or force value. To ensure that the automatic gain scaling program is scaled properly, the tool 16 must be matched to the floating follower device 31 during the initialization procedure. The initialization procedure should be performed when the following circumstances have occurred: the first time the system is used; a new motor is put into the system; the type and/or size of polishing/grinding heads are changed; and when the processor memory is damaged such as program loss. If none of these four situations has occurred, then upon initial start-up, the automatic gain scaling program can be skipped.

Automatic mute cycle is a second initialization software program that is executed when the system is powered up. The automatic mute cycle program takes approximately two seconds during which time the output current signal of the torque amplifier 113 is sloped up to cause the follower motor 41 to drive the tool 16 into contact with the workpiece 14 before manual or programmed data is considered. The automatic mute cycle program keeps the mechanical integrity of the high precision movement from damaging shock when the system is initialized. The automatic mute cycle program is also invoked when the open-loop feedback mode is selected and de-selected by a user.

Once the initialization programs have been completed, the control system is fully operational. With reference to 132, a user may program one or more baseline force values into the controller via a suitable switch such as a thumbwheel switch (not shown). Once baseline force values have been entered, a user may select desired baseline force values depending upon the mode of operation.

If a passive mode of operation has been selected via a mode control switch (not shown) on the user interface panel, the processor 107 will calculate a reference voltage based upon the selected baseline force value. The processor will then send a reference voltage signal to the torque amplifier 113 via I/O port 116 and line 122. Torque amplifier 113 outputs a current signal which is indicative of the reference voltage on line 122. The current signal on line 123 is fed to the DC servo motor and is indicative of a torque value necessary to achieve the desired baseline force or pressure value to be applied to the workpiece 14.

If open-loop feedback mode has been selected on the user interface panel, processor 106 will look to I/O port 115 for a current or load sensing feedback signal on line 121. Once processor 107 has read the signal, it is supplied to trending algorithm 141 and magnitude algorithm 139, respectively. Trending algorithm 141 samples the current signal over short time increments (such as 1 millisecond increments) for longer time durations (such as 20 millisecond durations). It is to be noted that other sampling rates and sampling durations are effective provided that at least a 10 to 1 (10:1) sampling to duration ratio be maintained. The samples are used to determine if a net increasing or net decreasing current or load feedback signal is occurring. In step 143, if the net result of the trending algorithm is an increasing current or load feedback signal, a positive sign is appended to the signal. If a net decreasing current or load feedback signal is detected, a negative sign is appended to the signal. With reference to step 145, the sign of the current sensing feedback signal is updated at the end of each time duration (i.e., every 20 milliseconds). The result of trending algorithm 141 is to remove transient noise spikes from the current sensing feedback signal that have been sensed by current or load sensing device 103.

Magnitude algorithm 139 operates to measure the rate of change of current or load sensing feedback signal. Magnitude algorithm 139 operates to measure the absolute change in magnitude of the signal at short time increments such as at a 1 millisecond sampling rate. Gain correction circuit 142 operates to adjust the gain of the current or load sensing feedback signal to within a range of 1 to 6. A signal having a high rate of change will receive a higher gain correction value than a signal having a low rate of change. The gain correction value is used to adjust the sensitivity of the follower motor 41 to loading changes being applied to the tool motor 24.

With reference to step 144, once the current or load sensing feedback signal has been processed by magnitude algorithm 139 and trending algorithm 141, the baseline force value that is present on line 119 at I/O port 118 is summed with the now compensated current sensing feedback signal to arrive at a reference voltage, step 146, which is based on the sum value above. The reference voltage on line 122 is indicative of the amount of torque required of the follower motor 41 to maintain a torque so that the force at contact point 30 equals the desired preselected baseline force value. The reference voltage signal on line 122 is sent to torque amplifier circuit 113 via I/O port 116. Torque amplifier 113 circuit works as previously indicated for the passive modes of operation. More particularly, torque amplifier 113 converts the reference voltage on line 122 into a specific current signal which will cause follower motor 41 to operate at a specific stalled rotor torque setting thereby providing the necessary pressure to maintain the desired baseline force or pressure value on the workpiece 14.

In an embodiment of the invention, the follower motor 41 is a conventional DC servo motor such as a 48 volt pancake-type motor as manufactured by PMI. It is contemplated that a linear servo motor can also be used.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A compliant follower device for maintaining constant contact force between a workpiece member and a tool member which are relatively movable with respect to one another, said follower device comprising reciprocally movable compliant follower means floatingly engaged with one of said workpiece and tool members for normally exerting a constant force thereagainst which urges said one member in a direction for constant force contact with the other member, and electric motor means drivingly coupled to said follower means for exerting a constant force on said follower means even as said follower means floatingly reciprocates so as to continually maintain said one member in constant force contact with said other member, said motor means including a movable output member which is drivingly coupled to said follower means and is subjected to constant force irrespective of compliant back-and-forth movement thereof so long as electric current supplied to said motor means remains constant.

2. An arrangement according to claim 1, wherein said motor means comprises a rotary servo motor having an output shaft which is drivingly coupled to said follower means through a rotary-to-linear motion converting mechanism which creates a positive driving relationship between said output shaft and said follower means and which can be back driven by the members, and said follower means including an elongate follower member supported for generally linear reciprocal movement.

3. An arrangement according to claim 2, wherein said rotary servo motor maintains a constant output torque for a constant current and permits the output torque to be changed linearly with respect to current as applied to the servo motor.

4. An arrangement according to claim 3, wherein said follower means cooperates directly with said tool member, a tool driving motor drivingly coupled to said tool member for effecting rotation thereof, and feedback control means for changing the current as applied to the servo motor in response to change in the contact force between the tool and workpiece members to compensate for inertial effects and the like as the tool member moves back and forth so as to maintain the contact force constant.

5. In a finishing tool assembly for permitting finishing of a surface on a workpiece, said finishing tool assembly including a rotatable tool adapted for contact with a, workpiece surface to effect finishing thereof, a tool-driving motor for drivingly rotating the tool, and a compliant follower device cooperating with the tool for enabling back-and-forth floating movement of the tool according to the surface of the workpiece while maintaining contact between the workpiece and tool, the improvement wherein said compliant follower device includes a follower member which is engaged with the tool for normally urging the tool into engagement with the surface of the workpiece, the follower member being floatingly supported for generally back-and-forth movement in a direction which extends transverse with respect to the surface of the workpiece, a rotary-to-linear motion and force transfer device coupled to said follower member, said motion transfer device being capable of being movably back driven by the follower member due to the tool reacting against the workpiece surface, and constant-torque rotary motor means having a rotary output coupled to the rotary-to-linear transfer device for applying constant force to said follower member irrespective of reciprocating back-and-forth movement thereof.

6. An assembly according to claim 5, wherein said rotary motor means comprises a direct current servo motor which is operable for maintaining a constant torque on the output when the output is maintained in a stall condition or is reversely driven by the follower member.

7. An assembly according to claim 6, wherein the follower member is supported so as to extend and be reciprocally movable in a vertical direction.

8. An assembly according to claim 7, including feedback control means for sensing load changes at the contact between the tool and workpiece and for adjusting the current to the rotary motor means to maintain a substantially constant contact force between the tool and workpiece.

9. An assembly according to claim 8, wherein the control means senses a change in the load imposed on the tool-driving motor.

10. An assembly according to claim 7, wherein the tool comprises a grinding belt supported on and extending between a pair of belt-supporting pulleys, one of said belt-supporting pulleys being driven by the tool-driving motor, and the workpiece being engageable with the grinding belt.

* * * * *

UNITED STATES PATENT AND TRADEMARK OFFICE
CERTIFICATE OF CORRECTION

PATENT NO. : 5,441,437
DATED : August 15, 1995
INVENTOR(S) : Bryan A. Hulstedt

It is certified that error appears in the above-indentified patent and that said Letters Patent is hereby corrected as shown below:

Column 11, line 25; delete the comma.

Signed and Sealed this

Ninth Day of January, 1996

Attest:

BRUCE LEHMAN

Attesting Officer  Commissioner of Patents and Trademarks